(12) United States Patent
Sieber

(10) Patent No.: US 7,690,900 B2
(45) Date of Patent: Apr. 6, 2010

(54) WAVE ENERGY ACCUMULATOR

(75) Inventor: Joe Sieber, 464 Balsam Street, Qualicum Beach, BC (CA) V9K 1H9

(73) Assignee: Joe Sieber, Qualicum Beach (CA)

( * ) Notice: Subject to any disclaimer, the term of this patent is extended or adjusted under 35 U.S.C. 154(b) by 762 days.

(21) Appl. No.: 11/133,149

(22) Filed: May 18, 2005

(65) Prior Publication Data

US 2009/0226331 A1    Sep. 10, 2009

(51) Int. Cl.
*F04B 35/00* (2006.01)

(52) U.S. Cl. .......................................... 417/331; 60/398

(58) Field of Classification Search .................. 405/76; 60/497, 500; 290/42, 53; 417/100, 331, 417/546, 459, 330, 541, 526, 527, 259–261, 417/562, 540, 523; 92/109–113, 162 R, 92/181 R, 183, 184, 181 P, 208, 209; 137/625.37–625.38; 91/228, 422, 488, 489, 490

See application file for complete search history.

(56) References Cited

U.S. PATENT DOCUMENTS

| | | | | |
|---|---|---|---|---|
| 123,203 A * | 1/1872 | Smart | ........................... | 417/526 |
| 183,500 A * | 10/1876 | Hulbert | ...................... | 417/526 |
| 211,168 A * | 1/1879 | Loudon | ....................... | 417/524 |
| 314,117 A * | 3/1885 | Foster | .......................... | 417/526 |
| 514,590 A * | 2/1894 | Dickens | ....................... | 417/524 |
| 644,093 A | 2/1900 | Place | | |
| 848,629 A | 4/1907 | Burkholder | | |
| 1,264,737 A | 4/1918 | Woods | | |
| 1,396,580 A * | 11/1921 | Kilcullen | ..................... | 417/333 |
| 1,411,016 A * | 3/1922 | Guelbaum | ................. | 92/117 R |
| 1,665,140 A | 4/1928 | Master | | |
| 2,688,984 A * | 9/1954 | Snyder | .......................... | 138/31 |
| 3,035,879 A * | 5/1962 | Jost et al. | ....................... | 92/112 |
| 3,163,985 A | 1/1965 | Bouyoucos | ..................... | 60/51 |
| 3,487,228 A | 12/1969 | Kriegel | .......................... | 290/52 |
| 3,515,889 A * | 6/1970 | Kammerer | .................... | 290/53 |
| 3,715,887 A | 2/1973 | Weatherly et al. | ............ | 60/59 T |
| 4,076,463 A | 2/1978 | Welczer | ....................... | 417/331 |
| 4,203,294 A | 5/1980 | Budal et al. | .................... | 60/497 |

(Continued)

FOREIGN PATENT DOCUMENTS

DE              287506             5/1913

*Primary Examiner*—Devon C Kramer
*Assistant Examiner*—Amene S Bayou
(74) *Attorney, Agent, or Firm*—Seed IP Law Group PLLC

(57) ABSTRACT

A fluid pressurization unit compresses a fluid in response to natural wave action on a body of water such as an ocean. The unit comprises a floating component and a piston assembly. The floating component has sufficient buoyancy to float on water waves and has a compression chamber with an inlet valve biased to receive a fluid at an intake pressure. The piston assembly is slidable within the compression chamber and has a piston shaft and a hollow piston head attached to the piston shaft, which defines a piston reservoir therein with an inlet valve in communication with the compression chamber and biased to receive the fluid at an output pressure, and an outlet for discharging fluid pressurized to at least the output pressure from the pressurization unit. The piston assembly is fixable in place relative to the floating component such that relative movement between the floating component and piston assembly compresses fluid from the intake pressure to at least the output pressure.

20 Claims, 8 Drawing Sheets

U.S. PATENT DOCUMENTS

| | | | |
|---|---|---|---|
| 4,204,406 A | 5/1980 | Hopfe | 60/398 |
| 4,313,716 A * | 2/1982 | Jones | 417/331 |
| 4,408,454 A | 10/1983 | Hagen et al. | 60/500 |
| 4,466,244 A | 8/1984 | Wu | 60/398 |
| 4,560,884 A | 12/1985 | Whittecar | 290/42 |
| 4,622,473 A | 11/1986 | Curry | 290/53 |
| 4,705,460 A | 11/1987 | Braun | 417/266 |
| 4,754,157 A | 6/1988 | Windle | 290/53 |
| 4,842,489 A * | 6/1989 | Lucisano | 417/238 |
| 5,031,664 A * | 7/1991 | Alaze | 138/31 |
| 5,179,837 A * | 1/1993 | Sieber | 60/500 |
| 5,394,695 A * | 3/1995 | Sieber | 60/398 |
| 5,842,838 A * | 12/1998 | Berg | 417/331 |
| 5,975,865 A * | 11/1999 | Manabe | 417/331 |
| 6,065,945 A * | 5/2000 | Zamzow | 417/401 |
| 6,812,588 B1 | 11/2004 | Zadig | |

* cited by examiner

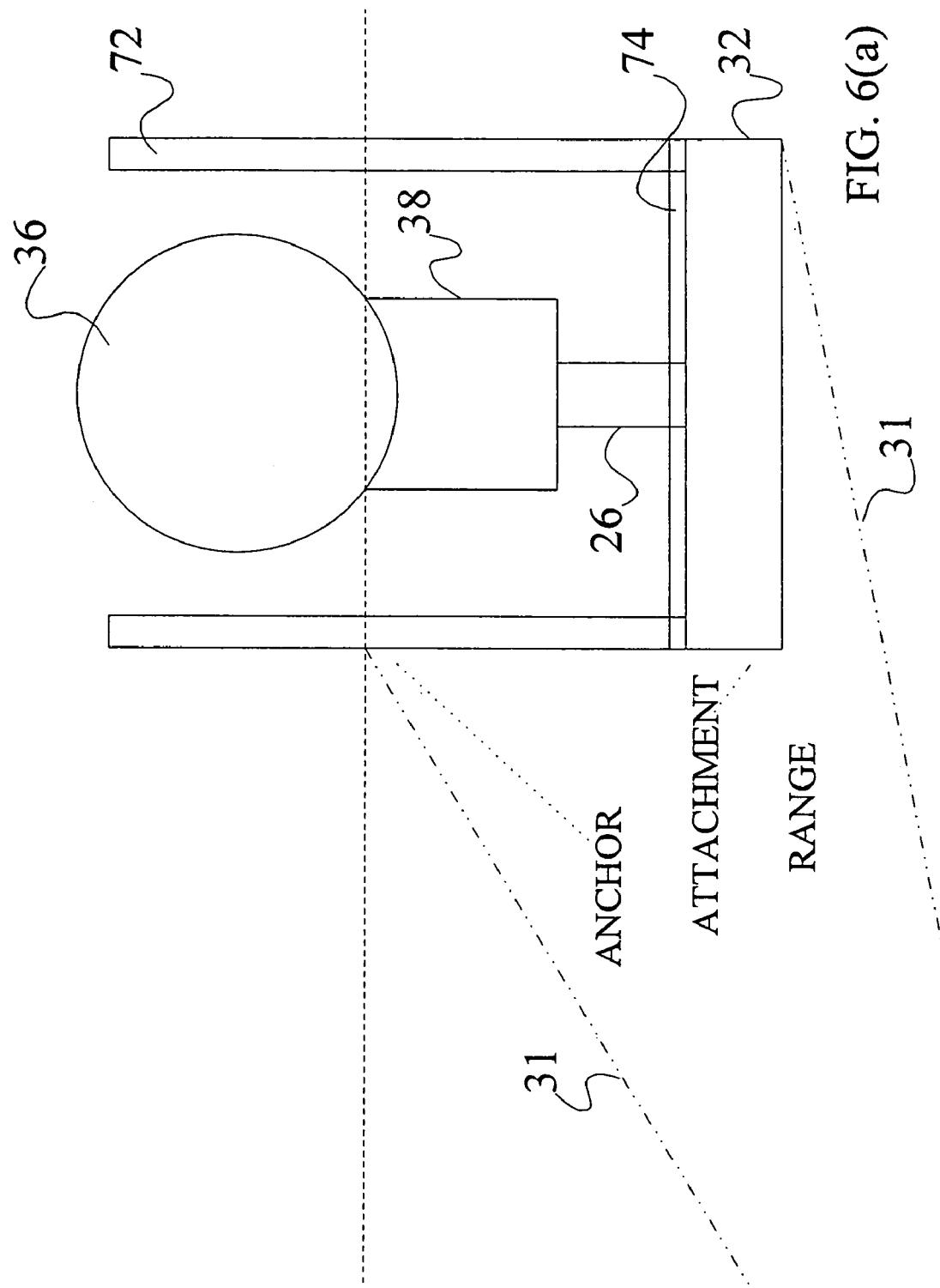

WAVE ENERGY ACCUMULATOR

BACKGROUND OF THE INVENTION

1. Field of the Invention

The invention described herein relates to accumulating wave energy, and in particular, to a method and apparatus for converting energy in water waves into potential energy for performing useful work and/or directly into useful work.

2. Description of the Related Art

Electrical energy for general use is being generated primarily by natural water flow, by burning fossil fuels and by nuclear generation. These methods have associated environmental problems and in the case of fossil fuels, an unacceptable depletion rate. This has led researchers to investigate the possibilities of harnessing energy from wave action and from wind.

A great variety of approaches have been proposed to generate energy from waves. One common approach is to utilize a float which rides up and down with wave motion guided by a fixed or anchored member which remains relatively stationary. An air compression cylinder is introduced between the float and the anchored member, together with associated intake and output conduits and check valves in order to store energy in compressed air which is accumulated as the float rises and falls with the wave action. Variations to such devices have been made to pressurize liquids or to pump water to fill an elevated water reservoir on shore. The potential energy stored in the pressurized fluid, e.g. air or water, is then used to drive a conventional machine such as a turbine/generator set to supply electrical energy.

One example of a prior art approach to the use of such arrangements is found in U.S. Pat. No. 644,093 to Place (issued Feb. 29, 1900). This older patent describes a conventional marine air compressor which also includes a submerged reservoir. The submerged reservoir is positioned below the float and air compression cylinder, and remains relatively stationary in deeper waters away from the active wave surface. The reservoir is anchored to the ocean floor and is connected in line between the air compression cylinder and the compressed air output conduit. A fluid filled dampening piston-cylinder arrangement is provided within the reservoir to compensate for the rise and fall of the water surface between high and low tide in ocean applications.

Another example is found in U.S. Pat. No. 4,754,157 to Windle (issued Jun. 28, 1988) which describes several further variations upon conventional float type wave energy devices, including means to extract energy from both the rise and fall of the float. Windle also teaches the use of a number of such devices connected in parallel to fill a water reservoir.

Single float type units are also described in U.S. Pat. No. 1,665,140 to Master, 2,487,228 to Kriegel, U.S. Pat. No. 3,515,889 to Kammier, U.S. Pat. No. 4,203,294 to Budal et al and U.S. Pat. No. 4,560,884 to Whittecar. Multiple parallel arrays of such units are described in U.S. Pat. No. 1,264,737 to Woods, U.S. Pat. No. 4,204,406 to Hopfe, U.S. Pat. No. 4,408,454 to Hagen et al, and U.S. Pat. No. 4,622,473 to Curry.

Conventional single unit devices and multiple arrays of units conventionally connected in parallel suffer from the disadvantage that a relatively high minimum amplitude of wave must be encountered before the pressure in the cylinder reaches a level at which useable pressurized fluid is generated. As a result, waves having an amplitude below such a minimum do not generate any energy. The minimum amplitude is determined by the design of the air compressing cylinder, and this disadvantage is present in both single unit devices and multiple unit arrays of the conventional methods and devices.

To clearly illustrate this point the following example is presented.

Assuming:
intake pressure $P_i$ = 14 psia
intended design output pressure $P_f$ = 250 psia
air cylinder internal diameter d = 10 in
air cylinder intake chamber length $I_i$ = 60 in
initial volume $V_i = \frac{1}{4} \pi d^2 I_i$
final volume $V_f = V_i P_i/P_f = \frac{1}{4} \pi d^2 I_f$
since PV = constant at a constant temperature
solving for $I_f = I_i P_i/P_f$ = 3.36 inches In summary, before compressed gas of 250 psia opens the check valve and exits the chamber, the piston must move over 56 inches or 95% of its full stroke. From the above example, it can be seen that the larger the pressure difference $P_d$ between intake pressure $P_i$ and output pressure $P_f$ the greater will be the length or percentage of the stroke required, relative to the cylinder length, before any compressed gas leaves the device (as represented mathematically $I_f = I_i P_i/P_f$).

As in the above example, the outlet of a chamber has a check valve which will only open to exhaust compressed gas when the pressure of the gas is equal to or greater than 250 psia. If a wave is encountered which provides a stroke of less than 56.64 inches, the gas is pressurized to a level less than 250 psia and there is no output of compressed gas. In effect the potential energy stored in the compressed gas generated at less than the final design pressure is not captured because the outlet valve does not open. The potential energy of the compressed gas below 250 psia is dissipated as the wave subsides and the gas decompresses.

Lowering the design pressure will increase the volume of compressed air generated and will capture energy from waves of lesser amplitude (i.e. if $P_f$=125 psia then $I_f$=6.72 inches; if $P_f$=50 psia then $I_f$=16.8 inches). This design choice is of little practical value because with compressed gases of lower pressure, higher volumes must be conducted and low pressure gases are of lesser value in driving turbines. Also, the decrease in pressure output is not offset by the decrease in minimum wave amplitude (i.e. from $P_f$=250 to 50 psia the minimum wave amplitude required to effect a stroke of 56.64 inches to one that effects a stroke of 43.20 inches is only 13.44 inches or 24%).

The conventional parallel arrays of compression units do not address this disadvantage and the total volume of energy captured is increased only by increasing the number of compression units. This solution is not cost effective given the capital cost of building an array of units and the operational cost of maintaining them.

Applicant's U.S. Pat. Nos. 5,179,837 and 5,394,695 disclose a method and system for generating energy from the motion of waves by a plurality of series-connected floating pressurization units, wherein each unit incrementally increases the pressure in a compression fluid flowing therethrough using energy in water waves. The system provides for a new ambient pressure starting point at each stage in the series, such that each successive downstream stage has a higher initial pressure than the previous stage(s). Energy is transferred from the waves to the fluid by relative movement between a first floating portion and second submerged portion of the unit. The second portion has a piston that extends upwardly into a compression chamber of the first portion.

Vertical oscillation of the first portion as it reacts to the wave causes the piston and chamber to vertically move relative to each other, thereby compressing the fluid in the chamber and driving the fluid through an outlet valve and to the next adjacent pressurization unit. When the cylinder bottom moves away from the piston, fluid compression stops and new fluid flows into the cylinder. The outlet valve is biased to open at a selected outlet pressure; when the pressure in the chamber decreases below the outlet pressure, fluid transmission to the next pressurization unit stops. Therefore, fluid tends to be conveyed through the device in pressurized pulses, wherein the oscillation of the pulses depends on the oscillation of the waves.

While applicant's device in his previous two patents disclose a useful means for storing wave energy in the compression fluid, it is desirable to refine and improve upon the ideas introduced in these patents. For example, it is desirable to smooth out the delivery of pressurized fluid through the device.

BRIEF SUMMARY OF THE INVENTION

The invention described herein addresses the disadvantages of the conventional devices and methods and provides for generating energy from waves in a novel, inventive and useful manner.

According to one aspect of the invention, there is provided a fluid pressurization unit for compressing a fluid in response to natural wave action on a body of water such as an ocean. This device comprises a floating component and a slidably coupled piston assembly. The floating component has sufficient buoyancy to float on water waves and has a compression chamber with an inlet valve biased to receive a fluid at an intake pressure. The piston assembly is slidable within the compression chamber and has a piston shaft and a hollow piston head attached to the piston shaft. Inside the piston head is a piston reservoir with an inlet valve in communication with the compression chamber and biased to receive the fluid at an output pressure. The piston reservoir also has an outlet for discharging fluid pressurized to at least the output pressure from the pressurization unit. The piston assembly is fixable in place relative to the floating component such that relative movement between the floating component and piston assembly compresses fluid from the intake pressure to at least the output pressure. The piston reservoir has a volume that contains enough fluid at or above the output pressure that the fluid is discharged from the pressurization unit during both compression and expansion strokes of the piston assembly. This results in a unit that has a smoother delivery of pressurized fluid than a unit that discharges fluid only during the compression stroke.

The piston shaft can be hollow and contain a fluid intake conduit fluidly coupled to the compression chamber inlet valve, and a fluid discharge conduit fluidly coupled to the piston reservoir outlet. By locating these conduits in the piston shaft, any imbalance or drag caused by conduits attached laterally to the pressurization unit can be avoided.

The floating component can further comprise a float attached to the compression chamber and having sufficient buoyancy to keep the floating component afloat.

The floating component can further comprise a housing attached to the float and housing the compression chamber, wherein a space between the compression chamber and housing defines a gas collection chamber fluidly coupled to the compression chamber inlet valve and the fluid intake conduit. The intake conduit can extend through the piston head and has a first outlet valve in fluid communication with the gas collection chamber, and a second outlet valve in fluid communication with the compression chamber.

The compression fluid can be a gas or a liquid. When liquid, the piston reservoir further comprises compressible material therein which compresses at or above the output pressure from an initial state to a compressed state, and which drives the liquid from the piston reservoir through the discharge conduit when expanding back to the initial state.

According to another aspect of the invention, there is provided a wave energy accumulator system comprising multiple pressurization stages fluidly coupled in series; each stage has at least one pressurization unit as described above. The pressurization unit at each successive stage operates between a range of intake and output pressures greater than the corresponding pressures at the preceding upstream stage. The total swept volume of the compression chambers at any one of the stages is smaller than that of the preceding upstream stage. As the pressure of the fluid is increased at each successive stage, wave action will cause all stages to pump and move fluid through the stages at increasing pressure and decreasing volume for use at the outlet from the last of the stages.

The system also comprises at least one intermediate reservoir fluidly coupled between two stages by fluid conduits, for accumulating pressurized fluid from an upstream stage and to provide gas for a downstream stage; each intermediate reservoir is positioned between the stages to reduce fluid pressure transmission losses.

All of the units can have compression chambers with the same swept volume and the number of units in a stage is less than the number of units in a preceding upstream stage. Alternatively, each stage can have one unit and the compression chamber in the unit of a stage has a smaller swept volume than the compression chamber of the unit in a preceding upstream stage.

The system further comprises a reservoir platform comprising a frame with buoyancy means adjustable to maintain the frame submerged at a selected depth, and wherein the piston shafts of each pressurization unit is attached to the frame. The intermediate reservoirs and fluid conduits are attached to or supported by the frame. The system can further comprise a high pressure reservoir attached to or supported by the frame and fluidly coupled to the last stage, and a turbine and generator fluidly coupled to the high pressure reservoir, that generates electricity from a high pressure fluid received from the high pressure reservoir.

A low pressure reservoir can be fluidly coupled to the turbine and generator for receiving a low pressure fluid discharged from the turbine and generator, and fluidly coupled to the first stage for supplying the low pressure fluid thereto.

The platform can further comprise a pillar mounted to each corner of the frame, and as may be additionally required, the pillars can have adjustable buoyancy that can be adjusted to adjust the position and orientation of the platform. Mooring lines can be fixed at one end to the ground or seabed and at another end to the platform in such a manner that the platform will list under certain lateral wind or wave forces, thereby enabling the floating component to move relative to the corresponding piston assembly in response to both lateral and vertical wind or wave forces. The mooring lines are attachable to different positions on the platform depending on the conditions; for example, the mooring lines can be attached to two adjacent pillars during calm conditions.

According to another aspect of the invention, there is provided a method of compressing a fluid in response to natural wave action on a body of water such as an ocean. The method comprises first conveying a fluid through a series of at least two stages; then incrementally increasing the pressure of the fluid as the fluid passes under the force of differential pressure between successive stages from an initial pressure input at an initial stage to a final pressure output from a final stage. The output from a preceding stage is the input to the succeeding stage in series; each stage has at least one unit and the fluid pressure in each unit is increased as a result of relative movement between a floating component and an associated piston assembly of the respective unit. The floating component floats in the body of water and rises and falls with the rise and fall of wave motion; the piston assembly member is anchored. The output from each stage is volumetrically smaller than the output from the preceding stage for a given wave action so that each stage is operating with the other stages continuously to decrease volume and increase pressure. The floating component has a piston reservoir that temporarily stores pressurized fluid that is discharged during both expansion and compression strokes of the piston assembly.

BRIEF DESCRIPTION OF THE SEVERAL VIEWS OF THE DRAWINGS

In order that the invention may be clearly understood, embodiments of the invention will be described by way of example with reference to the accompanying drawings in which.

DETAILED DESCRIPTION OF THE INVENTION

Figure 1:
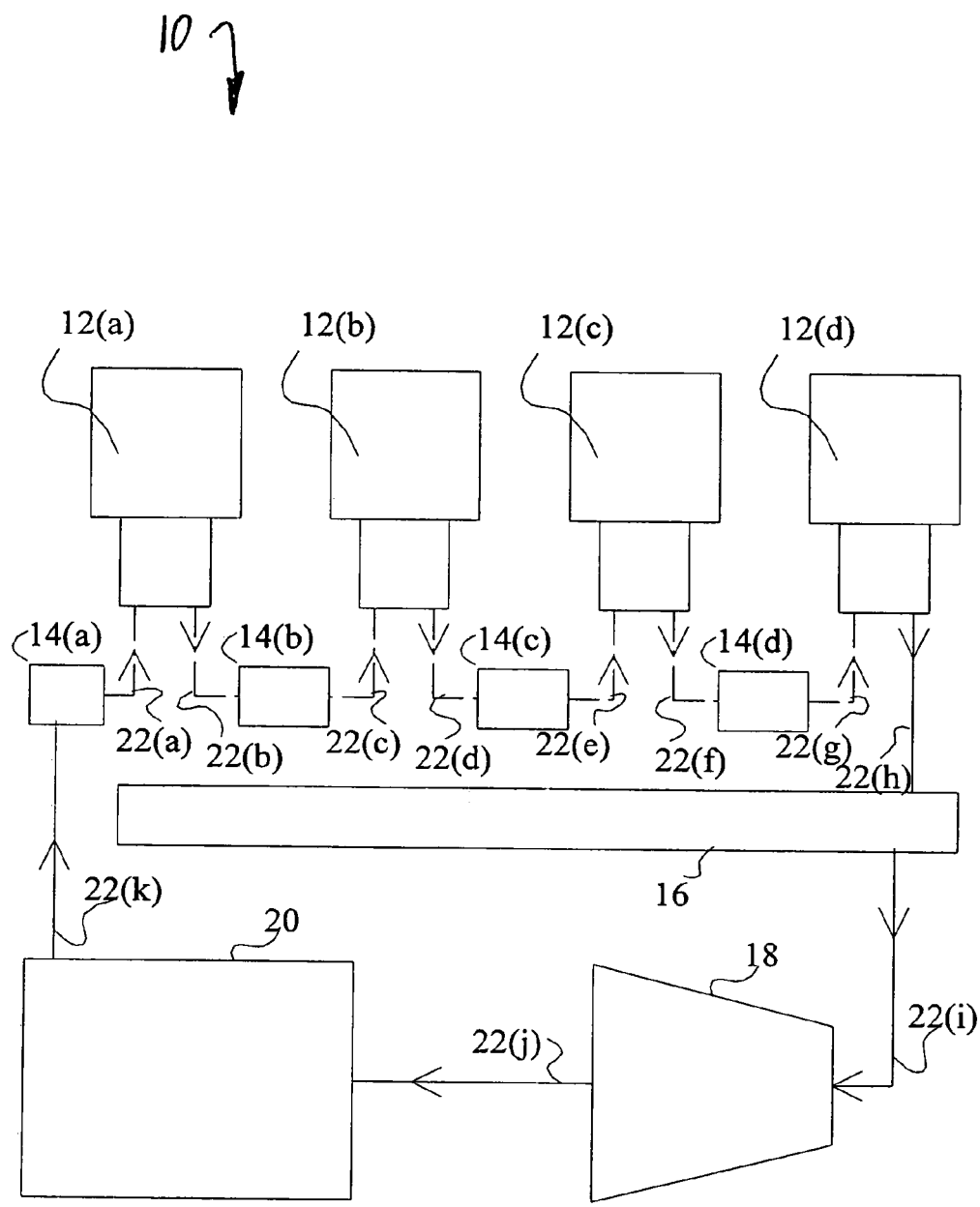
FIG. 1 is a schematic block diagram of a wave powered energy generation system according to one embodiment of the invention having four different pressurization stages and intermediate reservoirs connected in a closed loop series to a high pressure reservoir, turbine and electric generator, and a low pressure reservoir.

Referring to FIG. 1, and according to a first embodiment of the invention, a wave energy accumulator system 10 converts energy of water waves into potential energy for performing useful work, e.g. by generating electrical energy, and/or directly into useful work.

The system 10 comprises multiple pressurization stages 12($a$)-($d$), intermediate reservoirs 14($a$)-($d$), a high pressure reservoir 16, a turbine 18 and electric generator assembly and a low pressure reservoir 20 all of which are fluidly interconnected by fluid flow conduits 22($a$)-($k$) to form a closed fluid loop system. A compression fluid is circulated through this system 10, is pressurized by the pressurization stages 12($a$)-($d$), and is used to power the turbine 18 which is used to generate electric power.

Instead of a closed loop system, the compression fluid may be input at the initial pressurization stage 12($a$) and exhausted after exiting the turbine 18 if desired (not shown). Also, the number of pressurization stages is a design choice and can be varied depending upon various design parameters, including those explained below.

The system 10 is applicable to any compression fluid (i.e. gas or liquid) although the mechanical structures will change depending on the characteristics of the fluid. In this first described embodiment, the system 10 operates using a gas as the compression fluid, e.g. air. In the first embodiment, gas is conveyed through the four pressurization stages 12($a$)-($d$) in series and the gas pressure is incrementally increased at each stage as the gas passes therethrough. The gas enters the initial stage 12($a$) via intake conduit 22($a$) at an initial pressure $P_{initial}$ and leaves the final stage 12($d$) via outlet conduit 22($h$) at a final pressure $P_{final}$. The output of each of the preceding stages 12($a$)-($c$) is the input for the respective succeeding stages 12($b$)-($d$) via intermediate conduits 22($b$)-($g$) and intermediate reservoirs 14($b$)-($d$). Consequently, because of this series arrangement, the gas pressure in each stage is incrementally increased and the volume from one stage to the next is reduced as the pressure builds according to the relationship $P_{out}*V_{out}=P_{in}*V_{in}$. This means that for the system 10 as a whole, if the final pressurized volume $V_{final}$ is at an elevated pressure $P_{final}$, the air entering the system 10 at atmospheric pressure $P_{initial}$ must have a volume $V_{initial}$ stated by the formula $V_{initial}=P_{final}*V_{final}/P_{initial}$. In other words, the volume requirement for air at the inlet to the system can be many times the volume leaving the system in a given time, if the output pressure $P_{final}$ is increased correspondingly. This requirement can be met by using a series of gas compression devices of different dimensions so that the volume swept in each stage is less than that of a preceding stage or by designing each stage to be made up of multiple devices of the same or different dimensions and joining the devices in each stage to one another in parallel. Or, the system can employ a combination of both approaches. An example of such a design is disclosed in Applicant's previous U.S. Pat. No. 5,394,695.

Referring back to FIG. 1, the output gas from the last stage 12($d$) has a pressure $P_{final}$ which can be stored as potential energy in the high pressure reservoir 16 via conduit 22($h$). Conversion from potential energy to electrical energy is performed by the gas driven turbine 18 and electric generator assembly which receives gas from the high-pressure reservoir 16 via conduit 22($i$). Appropriate valve controls (not shown) will be employed to enable the system 10 to build up to the pressure $P_{final}$ needed to optimize turbine 18 operation. Flow would then be regulated to match the feed-through rate of the last stage 12($d$) which in turn correlates to the sea state at the time. The reservoir 16 would have a conventional blow off valve (not shown) for safety reasons.

The spent gas from the turbine 18/generator is output via conduit 22($j$) at a relatively low pressure and is stored in the low pressure reservoir 20 before being input to the initial stage 12($a$) via intake conduit 22 ($k$) to intermediate reservoir 14($a$) and conduit 22($a$) thereby circulating the gas in a closed loop. Provision can be made for topping up the system 10 to ensure gas is always available at the first stage 12($a$).

The reservoirs 16 and 20 provide for balancing and initializing the system pressures for improved operation of the turbine 18/generator and pressurization stages 12($a$)-($d$). To further balance the system pressures and to reduce transmission losses, the intermediate reservoirs 14($b$)-($d$) are placed in between each pressurization stage 12($a$)-($d$) and fluidly coupled to conduits 22($b$)-($g$) respectively. The intermediate reservoirs 14($b$)-($d$) span the gap between the stages and serve to minimize transmission losses by reducing friction losses.

Figure 2:
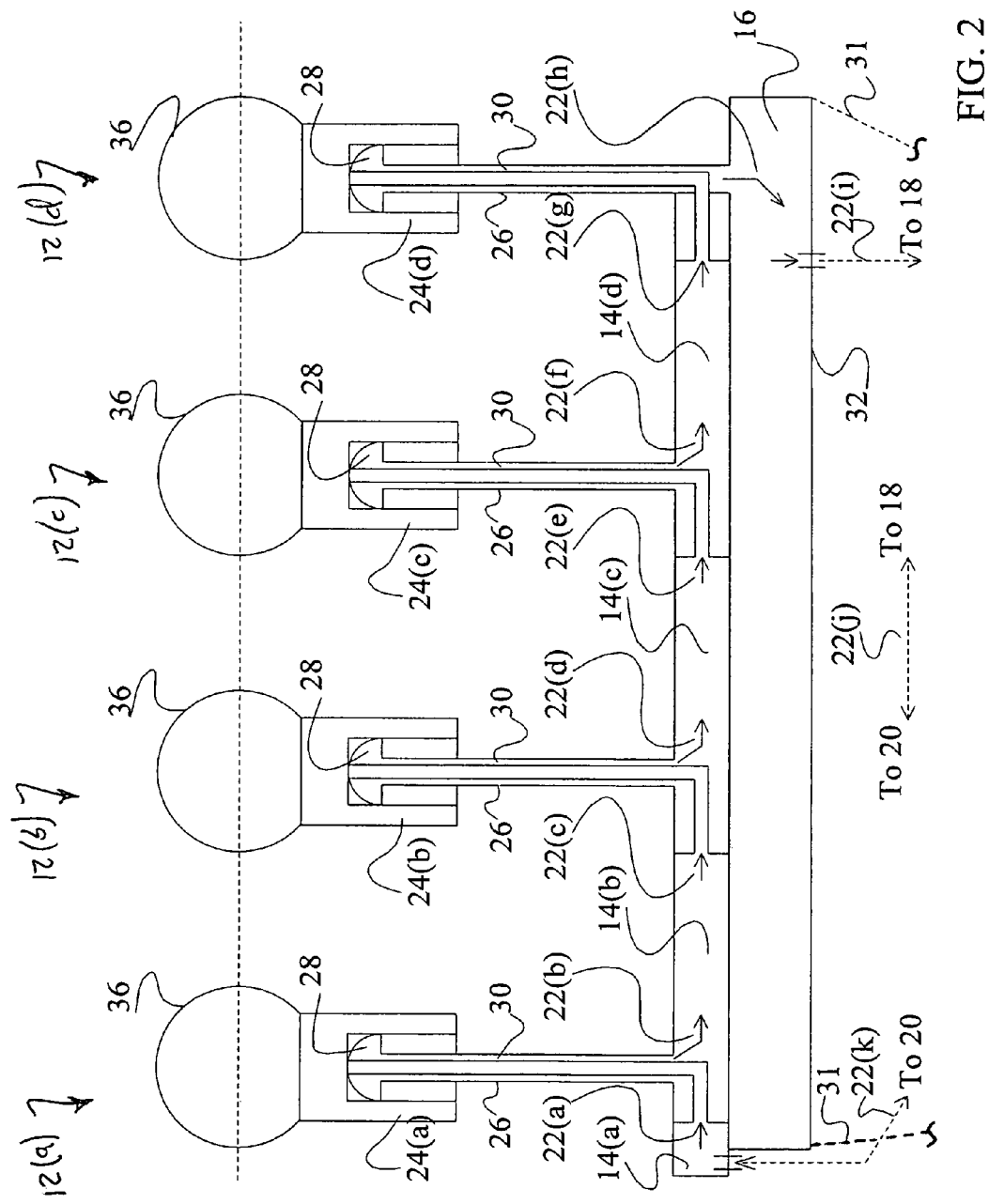
FIG. 2 is a schematic side elevation view of the system floating in water, the system having four floating compression units each serving as a pressurization stage and a submerged high pressure reservoir platform supporting the intermediate reservoirs.

Referring now to FIG. 2, each pressurization stage 12 comprises one compression unit 24, wherein a compression chamber (not shown in this figure) in each compression unit 24 (illustrated as 24(a)-24(d)) has a different swept volume; the differences in swept volume can be achieved by changing the piston area while keeping the compression chamber length constant. In particular, the chamber swept volume of each compression unit 24 of a particular stage is less than the chamber swept volume in the preceding stage. Alternatively, but not shown, each stage 12(a)-(d) has a different number of compression units 24, wherein each compression unit 24 in a stage has a pressurization chamber with the same swept volume. In particular, the total swept volume of all the compression unit 24 in a particular stage is less than the total swept volume of the compression unit 24 in a preceding stage. Each of the compression units 24(a)-(d) has a piston 26 comprising a piston head 28 that is slidably coupled to the compression chamber, and a piston shaft 30 that is attached at its top end to the piston head 28 and at its bottom end to a submerged reservoir platform 32.

The reservoir platform 32 comprises the intermediate reservoirs 14(a)-(d), and the high pressure reservoir 16. The intermediate reservoirs 14(a)-(d) are supported on the reservoir platform 32 or above the platform 32 as may be desired. These intermediate reservoirs 14(a)-(d) are larger pipes connected by smaller conduits 22(a)-(k). Transmission losses between stages 12(a)-(d) are minimized due to reduced friction losses. Compressed fluid delivered to and withdrawn from the intermediate reservoirs 14(a)-(d) does not appreciably alter their content and pressure. The reservoir platform 32 in turn is tethered to the ground by mooring lines 31, in the manner as will be described in detail below. A discharge conduit 22(i) transmits gas at the pressurized output pressure $P_{final}$ to the turbine 18 and generator located on a nearby barge (not shown in this Figure). Spent gas at pressure $P_{initial}$ is returned by a supply conduit to the low pressure reservoir 20, which can be incorporated into the barge. Alternatively, the turbine 18 and generator and the low pressure reservoir can be located on shore.

Figure 3:
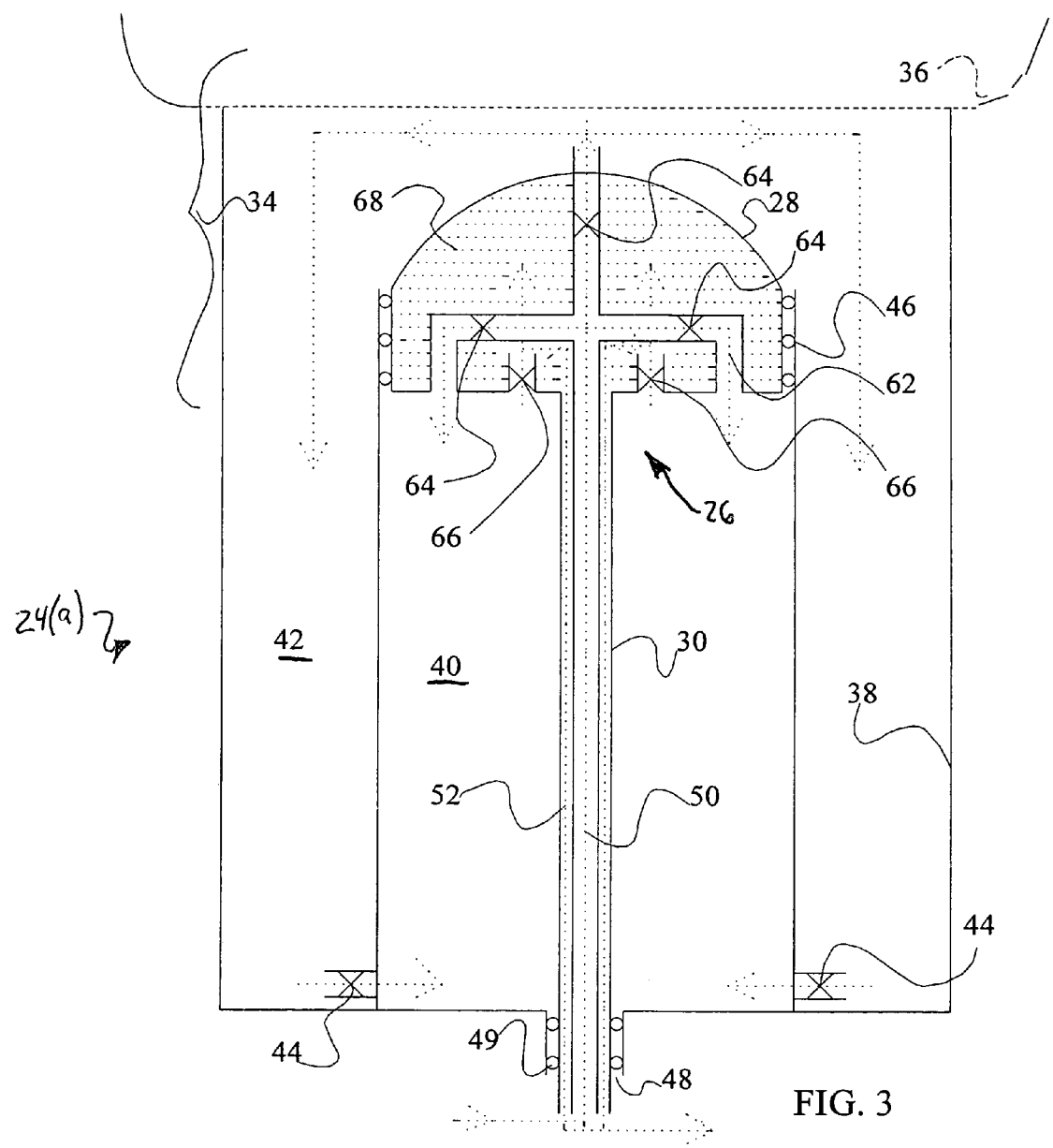
FIG. 3 is a schematic sectioned view of one compression unit configured to pump a gas.

Referring to FIG. 3, the construction and operation of each compression unit 24(a)-(d) in FIG. 2 is illustrated in more detail. For the purpose of illustration only, the reference numerals relate to a compression unit 24(a) in the first stage 12(a). As discussed, different input and output pressures may dictate variations in piston and chamber dimensions.

The compression unit 24(a) has a floating component 34 that is buoyant and slidably coupled to the piston shaft 30 such that the floating component 34 is free to move within a certain range with the motion of waves. The floating component 34 includes a buoyant surface float 36 which provides the buoyant force as it interacts with the waves, is buoyant enough to keep the floating component 34 afloat, and can be a hollow pressure vessel filled with air. The floating component 34 also includes a gas-tight pressurization housing 38 housing a compression chamber 40 which slidably receives the piston shaft 30; the annular space in between the pressurization housing 38 and the compression chamber 40 defines an input gas collection chamber 42. The compression chamber 40 and input gas collection chamber 42 are fluidly connected by one-way valves 44 biased to open at a designated input pressure $P_{in}$.

The system 10 can be calibrated so that when the floating component 34 is at a trough of a typical wave, the piston head 28 is at the top of the compression chamber 40, for the predominant wave regime of the moment i.e. in the maximum intake position, and when the floating component 34 is at the peak of the typical wave, the piston head 28 is at the bottom of the compression chamber 40, i.e. in the maximum compression position. Calibration can be made, such as by adjusting the depth of the submerged reservoir platform 32, as will be described further below. The piston head 28 can be a hollow dome-shaped structure attached to the top end of the piston shaft 30, and functions as a piston reservoir. The piston head dimensions are selected so that the piston head 28 is axially slidable within the compression chamber 40 with minimum circumferential clearance; circumferential seals 46 can be provided around the circumference of the piston head 28 to ensure a gas seal between the piston head 28 and compression chamber side wall.

The piston shaft 30 extends through an opening 48 at the bottom end of the pressurization housing 38 and into the compression chamber 40; the piston shaft 30 can be positioned along the vertical centerline of the pressurization housing 24(a) to preserve the balance of the floating component 34. Seals 49 can be provided at the bottom opening 48 to prevent gas from leaking out of the compression chamber 40. The piston shaft 30 can be a hollow tubular structure and can contain a concentrically arranged inner input gas supply tube 50 for supplying gas at a designated input pressure $P_{in(a)}$ into the gas collection chamber 42 and the compression chamber 40 when it recharges; the annular space between the inner and outer tubes define a gas discharge conduit 52 for discharging gas at a designated output pressure $P_{out(a)}$ from the compression chamber 40. This arrangement is particularly advantageous over flexible conduits mounted laterally to the floating component, as the gas conduits in this embodiment are protected by the piston shaft housing and are positioned such that that they do not imbalance the floating component 34.

The supply tube 50 extends upwards through the piston head 28 and opens into the input gas collection chamber 42. Branch tubes 62 fluidly coupled to the supply tube 50 extend laterally and downwardly through the piston head 28 and open into the compression chamber 40. One-way check valves 64 are provided at the outlet of the supply tube 50 and branch tubes 62; these valves 64 are biased to open at the designated input pressure $P_{in}$. This arrangement is particularly useful to rapidly recharge the compression chamber 40 with gas during the piston's intake stroke.

The base of the piston head 28 has multiple one-way check valves 66 that are biased to open at a designated output pressure $P_{out}$. The valves 66 open and allow gas inside the compression chamber 40 at or above output pressure $P_{out}$ into the hollow portion 68 of the piston head 28 ("piston reservoir"). The piston reservoir 68 is fluidly coupled to the discharge conduit 52 such that pressurized gas inside of the piston reservoir 68 will flow out of the piston reservoir 24(a) via discharge conduit 52 and into the next downstream piston reservoir 24(b); in effect, the piston reservoir 68 serves as a buffer to temporarily stored pressurized gas. The output pressure at this first stage $P_{out(a)}$ will be the input pressure at the next stage (minus frictional losses); assuming frictional losses are negligible, the output pressure at the first stage will be the same as the input pressure at the second stage: $P_{out(a)} = P_{in(b)}$.

For each compression unit 24, the pressure of the gas in the compression chamber 40 is incrementally increased from the input pressure $P_{in}$ to the output pressure $P_{out}$ by the reciprocating motion of the piston 26. Consider the compression chamber 40 with the piston 26 in its maximum intake position (floating component 34 in a trough of a wave). In the first compression unit 24(a), the one-way valves 44 and 64 are biased to open at an input pressure $P_{in}$ that is at or lower than the expected pressure inside the low pressure reservoir 20 $P_{initial}$. This ensures that gas at $P_{initial}$ will flow through the supply tube 50 and into the gas collection chamber 42 as well as the compression chamber 40 via both valves 44 and 64. The input pressure in the gas collection and compression chambers 40, 42 will thus be equal to the low pressure reservoir 20 pressure $P_{in}=P_{initial}$.

When the floating component 34 rises towards a wave's peak, the piston 26 enters into its compression stroke. During the compression stroke, gas inside the compression chamber 40 is compressed. When the pressure inside the compression chamber 40 reaches or exceeds the calibrated output pressure $P_{out}$, gas flows through the check valves 66 and into the piston reservoir 68. Gas inside the piston reservoir 68 is pressurized at a pressure $P_{buffer}$ at or above the output pressure $P_{out}$ and will flow through the discharge conduit 52 and to the next stage. When the wave falls and the piston 26 enters into its next intake (expansion) stroke and draws gas from the collection chamber 42 into the compression chamber 40, gas in the piston reservoir 68 will continue to be discharged through the discharge conduit 52 until the piston reservoir pressure $P_{buffer}$ falls to the output pressure $P_{out}$. The volume of the piston reservoir 68 can be selected to ensure that it can contain enough pressurized fluid to discharge during both expansion and compression strokes. Because of the proximity of the piston reservoir, there is minimal constriction and more gas is transferred. This arrangement is particularly useful for smoothing out the delivery of gas from each piston reservoir 24(a)-(d), and preventing gas from being discharged in sharp high-pressure pulses during the compression stroke only.

It will be apparent that the above described embodiment is adaptable to use any compressible fluid such as air or nitrogen gas. In a closed loop series arrangement, dry air or nitrogen gas is preferred due to its relative abundance and low price, negligible environmental impact and non-corrosive qualities.

It should be noted that the higher the increase in pressure between stages, the more energy each device will require for compression if each device uses the same piston diameter. There is a maximum buoyant force available from the wave which is dictated by the wave height. The surface float 36 should be proportioned to sit between the waves, and be no more than ¼ the size of the wave length, in order to move up and down with the waves. If the float 36 is too large it will straddle adjacent waves and its action will be attenuated. An elongate float (not shown) extending parallel to the wave ridges may be desirable. The diameters of the pistons 26 should be designed so that the pressure multiplied by the active area of the piston 26 is less than the available buoyant force. The piston diameter can be designed for each stage to suit the planned pressure increase.

For a particular wave regime, the wave heights and therefore the buoyant forces available will be fairly constant. At low initial pressure increases between stages, the same piston areas for all compression units can be selected for convenience, with the initial stages using only part of the available buoyant force. At higher pressure increments, the piston areas for each compression unit can be reduced relative to the upstream compression units. Various arrangements for the number and dimensions of the compression units 24(a)-(d) in each stage are possible, and can be selected within the scope of this invention.

Generally, the vertical movement or stroke of the floating component 34 of a compression unit 24 can be considered constant for all the compression units 24 in a stage because the compression units 24 are all affected by the same wave. There will be a minimum stroke to compress the gas to a sufficient pressure $P_{out}$ to open the valve 66 and to send gas to the next stage. If the wave height is smaller than this minimum stroke, the compression unit 24 will not pump. Different arrangements may have different minimum strokes. For example, for compression units 24 all having the same piston area, when each successive stage has half as many compression units 24, the minimum stroke is ½ the chamber length for the example of doubling the pressure at each stage (as mentioned previously). However, if each successive stage has ¼ the devices, the minimum stroke is ¾ the chamber length. Therefore, if the effective wave height drops to ¾ the chamber length, the first arrangement will still pump volume (at a reduced amount) yet the second arrangement will not. The above is all a matter of design criteria such as wave heights, final pressure, final volume and buoyancy forces.

Figure 4:
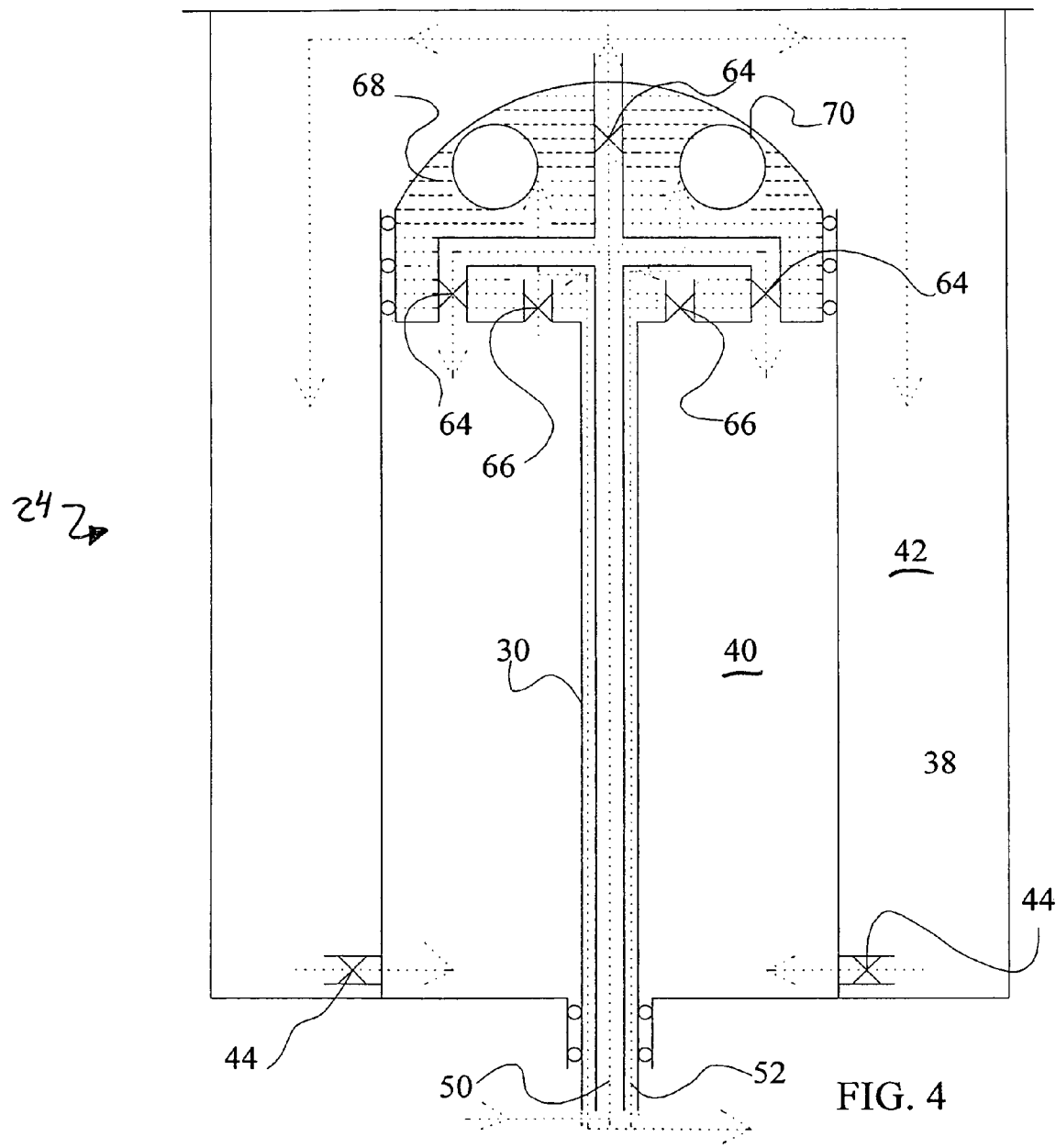
FIG. 4 is a schematic sectioned view of another embodiment of the compression units, configured to pump a liquid.

Referring to FIG. 4 and according to a second embodiment of the invention, the compression units 24 can be adapted to pump liquid. To adapt the embodiment shown in FIG. 3. to pressurize a liquid such as water, an elastic toroidal compression device 70 can be installed in each buffer 68, and pre-pressurized to the same pressure as the output from the previous stage. Like the first embodiment, liquid will flow through the supply tube 50 and into the collection chamber 42 and compression chamber 40. During the compression stroke, the liquid, being substantially incompressible, will flow through valves 66 into the buffer 68, and out of the discharge conduit 52. Pressure from the compression stroke will also cause the water in the buffer 68 to compress the elastic compression member, such that when the piston 26 enters into its intake stroke and water stops flowing into the buffer 68 from the compression chamber 40, water continues to be pumped under pressure through the discharge conduit 52 by the expansion of the compression device 70. Use of such compression devices 70 is thus advantageous to smooth out the delivery of pressurized fluid through the system 10. The compression device 70 can be made of a solid compressible material, or be a hollow gas filled structure pre-pressurized to the same pressure as the output pressure from the previous stage.

Other compression devices 70 can be used to pump water through the system 10, including a diaphragm (not shown) mounted inside the buffer 68 and separating the buffer into a lower portion for receiving water, and an upper portion filled with air. When water enters into the lower portion, the diaphragm deflects and compresses the air within the upper portion. As before, the upper portion would need to be pre-pressurized to the same, pressure as the output from the previous stage. During the expansion stroke, water stops flowing into the buffer 68, water continues to be pumped under pressure out through the discharge conduit 52 by the expansion of the diaphragm.

Figure 5A:
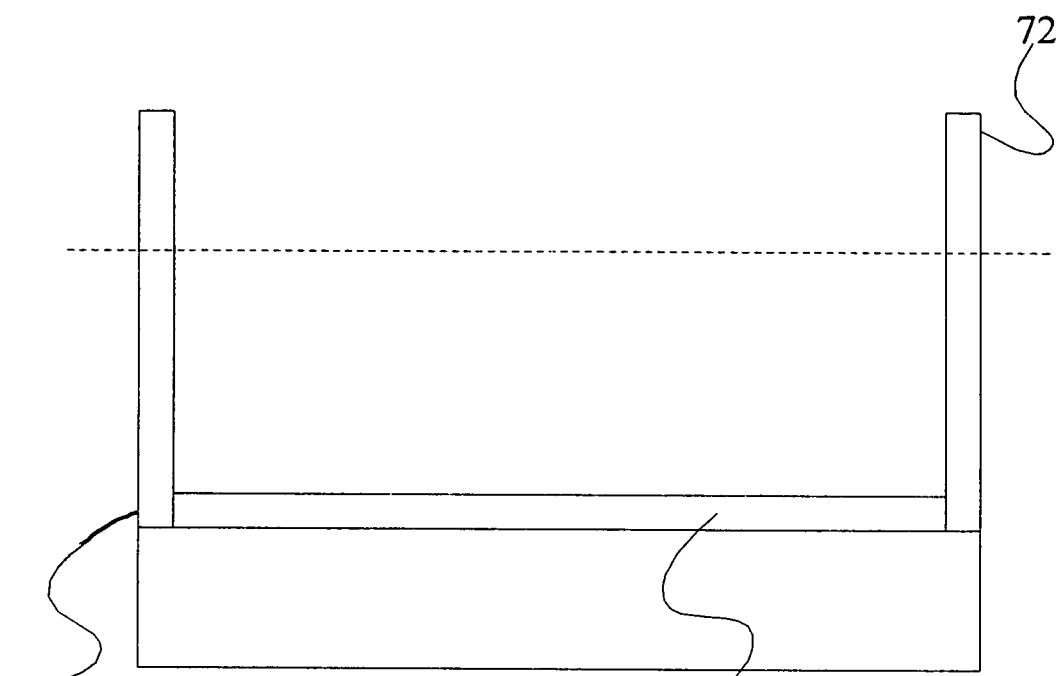
FIGS. 5($a$) and ($b$) are schematic side elevation and plan views of the reservoir platform, which includes a reaction plate and multiple vertical pillars extending upwards therefrom.
Figure 5B:
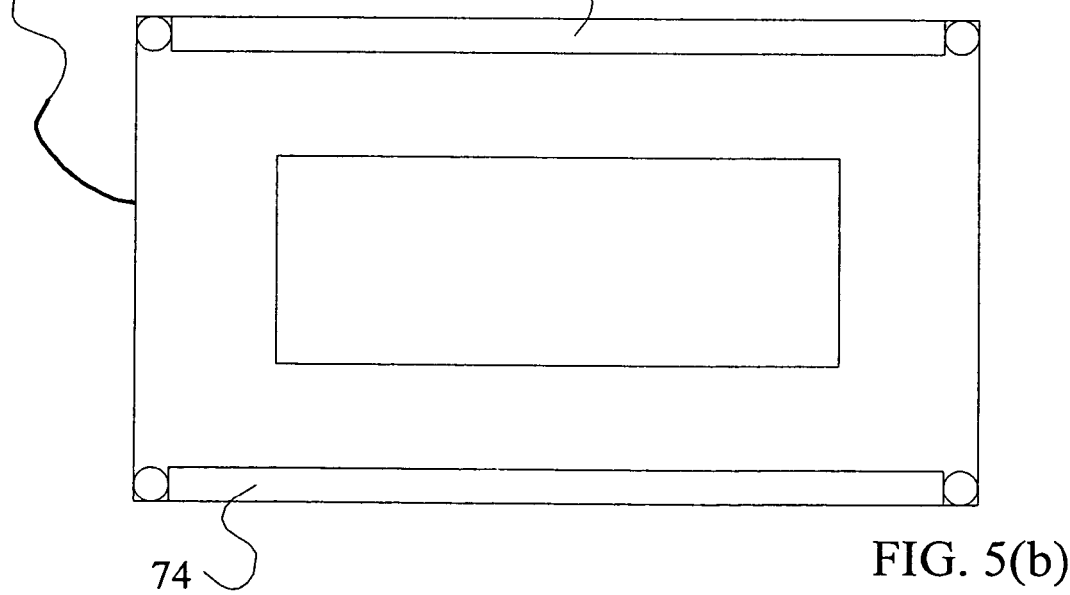

Referring now to FIGS. 5(a) and (b), the reservoir platform 32 serves to accumulate pressurized fluid at $P_{final}$ to operate the turbine 18/generator, as well as to provide a stable base for the operation of the coupled compression units 24(a)-(d), i.e. serve to fix the pistons 26 in place while the floating components 28 move with the waves. The platform 32 has a generally rectangular frame in plan view, that can be constructed from high pressure PVC piping and structural members. The dimensions and shape of the platform 32 can be scaled to accommodate the number of compression units 24 deployed. The frame is designed with sufficient mechanical strength to support the intermediate reservoirs 14, high pressure reservoir 16, vertical pillars 72, and buoyancy tubes 74, and to serve as an attachment point for the piston 26 of each compression unit 24(a)-(d). The vertical pillars 72 can be hollow and can serve to provide additional buoyancy to the platform 32, as well as to provide a location for anchoring mooring lines to the platform 32. The pillars 72 can be provided at each corner, and additionally as required, of the platform 32 and extend upwards; means are provided for adjusting the buoyancy of each pillar 72. Such buoyancy adjustments can be made to help regulate the depth and orientation of the platform 32. Two of the pillars 72 can serve as anchoring attachments for mooring lines 31 (see FIGS. 6(a) to (c)) that regulate the movement of the system 10 in response to wind and other environmental conditions.

A pair of inflatable buoyancy tubes 74 can extend along the longitudinal edge of each side of the platform 32. The buoyancy tubes 74 can be inflated to give the platform 32 a slightly negative buoyancy, and keep the platform 32 submerged at a designated depth. The designated depth is selected to keep each piston 26 and corresponding compression chamber 40 at their calibrated relative positions to correspond with the particular wave regime present. That is, if the wave regime decreases, depth of the platform 32 can be raised to ensure that the piston head 28 just "bottoms out" when the pressurization unit 34 rises with the waves. Conversely, the platform depth can be lowered when the wave regime increases. This increases the length of the compression stroke to ensure that the piston head 28 just bottoms out when the pressurization unit 34 rises with the waves. Also, the buoyancy of the tubes 74 can be increased to cause the platform 32 to rise to the surface for maintenance and servicing.

Figure 6B:
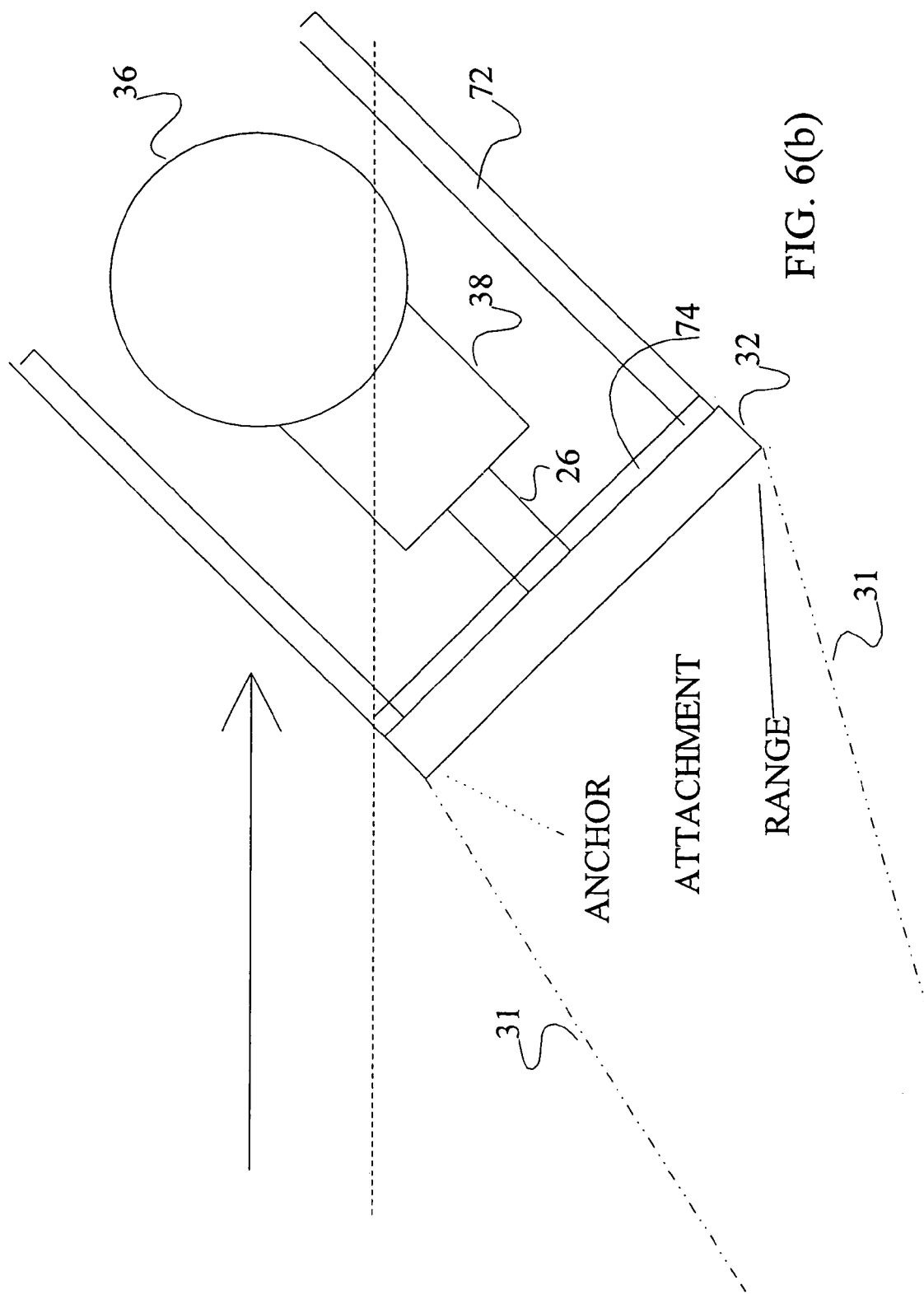
FIGS. 6($a$) and ($b$) are schematic end elevation views of the system at horizontal and tilted positions, and FIG. 6($c$) is a plan view of same.
Figure 6C:
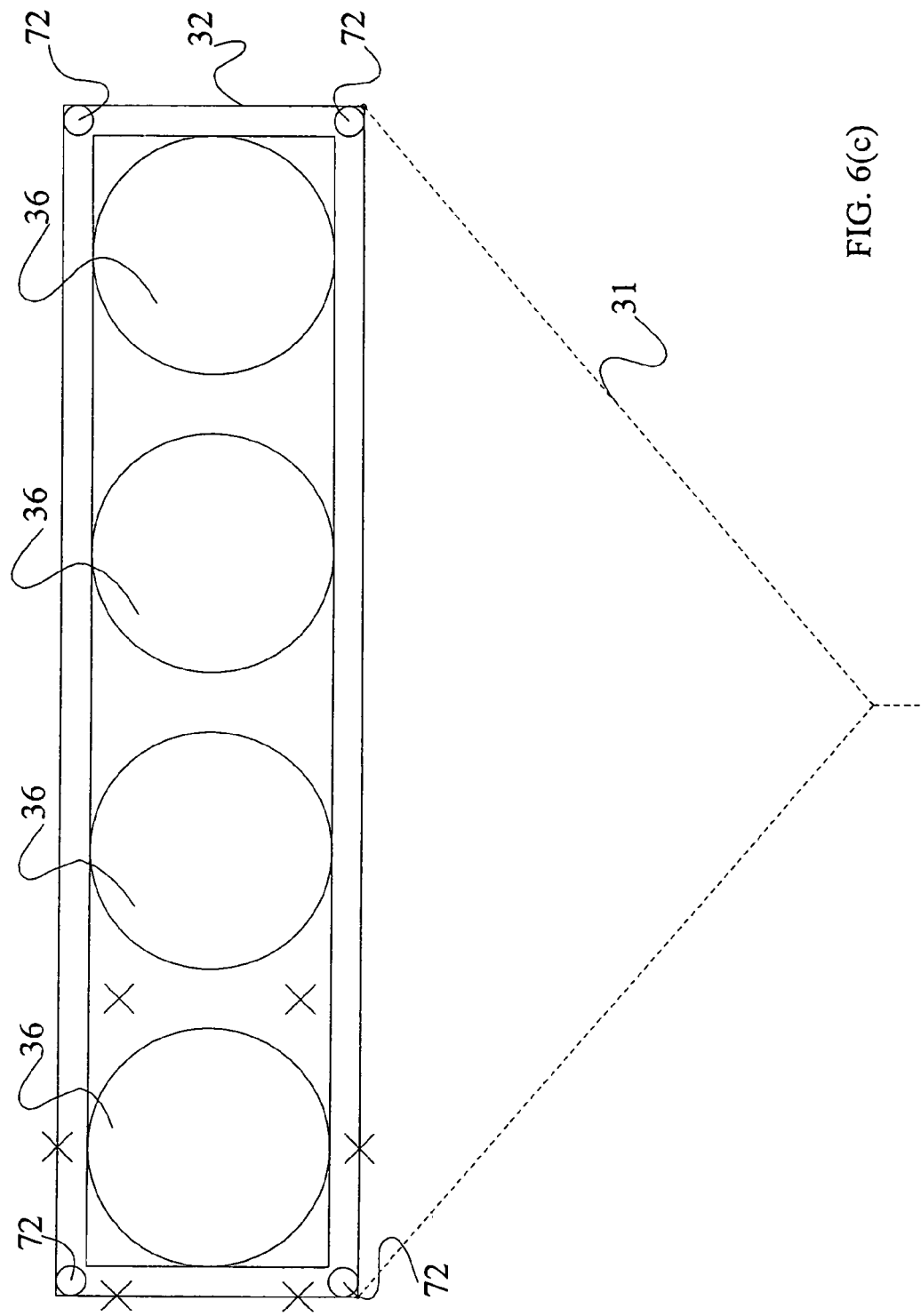

Referring now to FIGS. 6 (a) to (c), two mooring lines 31 are attached to respective longitudinal ends of the platform 32 in such a way that enable the platform 32 to harness lateral wave and wind energy as well as wave energy heave forces. That is, the mooring lines 31 are attached to the platform 32 such that the platform 26 can list in the water. When encountering lateral wave and wind forces, the system 10 will list to a maximum list angle defined by the mooring line geometry, and the compression units 24(a)-(d) will oscillate along a vector defined as the sum of the vertical wave movement (vertical vector), and lateral wave and wind forces (horizontal vector). The mooring line geometry can be varied depending on the conditions. FIG. 6(a) shows a range of anchor attachment points for the mooring lines 31 when the platform 32 is in calm conditions; under such conditions, the mooring lines 31 can be attached to a pillar 72 or along the bottom of the platform frame. FIG. 6(b) shows a range of anchor attachment points for the mooring lines 31 when the platform is in storm conditions; under such conditions, the anchoring range is limited to the bottom of the frame only. The selection of the appropriate anchoring position on the platform 32 will be dictated by the amount of desired platform list.

Other embodiments will become apparent to a person skilled in the art, the scope of the invention defined by the appended claims. In particular, structures capable of pumping fluid under the action of wave motion may be modified in accordance with the invention as described in order to accumulate energy in a fluid sufficient to drive a prime mover such as a turbine. All such modifications are within the scope of the invention.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A fluid pressurization unit for accumulating energy from natural wave action on a body of water such as an ocean, the unit comprising:
   (a) a floating component having sufficient buoyancy to float on water waves and having a compression chamber with an inlet valve biased to receive a fluid at or above an intake pressure; and
   (b) a piston assembly slidable within the compression chamber in first and second directions, and having a piston shaft and a hollow piston head attached to the piston shaft and having a piston reservoir therein with
      an inlet valve in communication with the compression chamber and biased to receive the fluid at or above an output pressure, and
      an outlet for discharging fluid pressurized to at least the output pressure from the pressurization unit;
   the piston assembly performing a compression stroke when sliding in the first direction and an expansion stroke when sliding in the second direction;
   the piston reservoir operable as a pressure buffer to temporarily store the fluid at or above the output pressure between the inlet valve and the outlet, and having a volume sufficient to discharge the fluid from the piston reservoir during the entirety of one of the compression strokes and the entirety of the next expansion stroke, the fluid entering the piston reservoir through the inlet valve only during the compression stroke; and
   the piston assembly being fixable in place relative to the floating component such that relative movement between the floating component and piston assembly compresses fluid from the intake pressure to at least the output pressure.

2. A fluid pressurization unit as claimed in claim 1 wherein the piston shaft is hollow and contains a fluid intake conduit fluidly coupled to the compression chamber inlet valve, and a fluid discharge conduit fluidly coupled to the piston reservoir outlet.

3. A fluid pressurization unit as claimed in claim 2 wherein the floating component further comprises a float attached to the compression chamber and having sufficient buoyancy to keep the floating component afloat.

4. A fluid pressurization unit as claimed in claim 3 wherein the floating component further comprises a housing attached to the float and housing the compression chamber, wherein a space between the compression chamber and housing defines a gas collection chamber fluidly coupled to the compression chamber inlet valve and the fluid intake conduit.

5. A fluid pressurization unit as claimed in claim 4 wherein the intake conduit extends through the piston head and has a first outlet valve in fluid communication with the gas collection chamber, and a second outlet valve in fluid communication with the compression chamber.

6. A fluid pressurization unit as claimed in claim 5 wherein the compression fluid is liquid and the piston reservoir further comprises compressible material therein which compresses at or above the output pressure from an initial state to a compressed state, and which drives the liquid from the piston reservoir through the discharge conduit when expanding back to the initial state.

7. A wave energy accumulator system comprising
   multiple pressurization stages fluidly coupled in series, each stage having at least one pressurization unit as claimed in claim 1, the pressurization unit at each successive stage operating between a range of intake and output pressures greater than the corresponding pressures at any preceding upstream stage and the total swept volume of the compression chambers at any one of the stages being smaller than that of the preceding upstream stage, whereby as the pressure of the fluid is increased at each successive stage, wave action will cause all stages to pump and move fluid through the stages at increasing pressure and decreasing volume for use at the outlet from the last of the stages.

8. A system as claimed in claim 7 further comprising at least one intermediate reservoir fluidly coupled between two stages by fluid conduits, for accumulating pressurized fluid from an upstream stage and to provide gas for a downstream stage, each intermediate reservoir positioned between the stages to reduce fluid pressure transmission losses.

9. A system as claimed in claim 7 wherein all of the units have compression chambers with the same swept volume and the number of units in a stage is less than the number of units in a preceding upstream stage.

10. A system as claimed in claim 7 wherein each stage has one unit and the compression chamber in the unit of a stage has a smaller swept volume than the compression chamber of the unit in a preceding upstream stage.

11. A system as claimed in claim 8 further comprising a reservoir platform comprising a frame with buoyancy means adjustable to maintain the frame submerged at a selected depth, and wherein the piston shaft of each pressurization unit is attached to the frame.

12. A system as claimed in claim 11 wherein the intermediate reservoirs and fluid conduits are attached to or supported by the frame.

13. A system as claimed in claim 12 wherein the system further comprises a high pressure reservoir attached to or supported by the frame and fluidly coupled to the last stage, and a turbine and generator fluidly coupled to the high pressure reservoir, that generates electricity from a high pressure fluid received from the high pressure reservoir.

14. A system as claimed in claim 13 further comprising a low pressure reservoir fluidly coupled to the turbine and generator for receiving a low pressure fluid discharged from the turbine and generator, and fluidly coupled to the first stage for supplying the low pressure fluid thereto.

15. A system as claimed in claim 11 wherein the platform further comprises a pillar mounted to each corner of the frame, wherein the pillars have adjustable buoyancy.

16. A system as claimed in claim 15 further comprising mooring lines fixable at one end to the ground or seabed and at another end to the platform in such a manner that the platform will list under certain lateral wind or wave forces, thereby enabling the floating component to move relative to the corresponding piston assembly in response to both lateral and vertical wind or wave forces.

17. A system as claimed in claim 16 wherein the mooring lines are attachable to the pillars.

18. A fluid pressurization unit as claimed in claim 1 wherein the piston reservoir is dome-shaped.

19. A method of accumulating energy from natural wave action on a body of water such as an ocean, the method comprising:

conveying a fluid through a series of at least two stages; and
incrementally increasing the pressure of the fluid as the fluid passes under the force of differential pressure between successive stages from an initial pressure input at an initial stage to a final pressure output at a final stage, the output from each stage being the input to any respective succeeding stage, in series, each stage having at least one unit and the fluid pressure in each unit being increased as a result of relative movement in first and second directions between a floating component and an associated piston assembly of the respective unit, the floating component floating in the body of water and rising and falling with the rise and fall of wave motion, the piston assembly member being anchored, the output from each stage being volumetrically smaller than the output from any preceding stage for a given wave action so that each stage is operating with the other stages continuously to decrease volume and increase pressure, the floating component having a piston reservoir, operable as a pressure buffer, for temporarily storing pressurized fluid, the piston reservoir having a volume sufficient to discharge the fluid from the piston reservoir during the entirety of a compression stroke, which results from movement in the first direction, and the entirety of a next expansion stroke, which results from movement in the second direction, the fluid entering the piston reservoir only during the compression stroke.

20. A method as in claim 19 wherein the piston reservoir is dome-shaped.

* * * * *